United States Patent
Dedieu et al.

(10) Patent No.: US 7,352,859 B2
(45) Date of Patent: Apr. 1, 2008

(54) AUDIO EARPIECE FOR WIDEBAND TELEPHONE HANDSETS

(75) Inventors: Stephane Dedieu, Ottawa (CA); Hans Beisner, Oxford Mills (CA); Kiichiro Tanaka, Ottawa (CA); Philippe Moquin, Ottawa (CA)

(73) Assignee: Mitel Networks Corporation (CA)

( * ) Notice: Subject to any disclaimer, the term of this patent is extended or adjusted under 35 U.S.C. 154(b) by 395 days.

(21) Appl. No.: 10/460,449

(22) Filed: Jun. 11, 2003

(65) Prior Publication Data

US 2003/0231764 A1    Dec. 18, 2003

(30) Foreign Application Priority Data

Jun. 14, 2002    (GB) ................. 0213732.1

(51) Int. Cl.
*H04M 1/00*    (2006.01)
*H04M 9/00*    (2006.01)

(52) U.S. Cl. ............. 379/420.01; 379/431; 379/433.02

(58) Field of Classification Search ........... 379/420.01, 379/433.02, 431, 433.01, 433.04, 432, 444, 379/446
See application file for complete search history.

(56) References Cited

U.S. PATENT DOCUMENTS

| | | | |
|---|---|---|---|
| 4,395,597 A | | 7/1983 | Suzuki et al. |
| 5,058,154 A | * | 10/1991 | Andersen ............... 379/433.02 |
| 5,717,753 A | * | 2/1998 | Birmanns ................... 379/419 |
| 5,729,605 A | * | 3/1998 | Bobisuthi et al. ............ 379/430 |
| 5,790,679 A | * | 8/1998 | Hawker et al. .............. 381/163 |
| 5,953,414 A | * | 9/1999 | Abraham et al. ....... 379/433.02 |
| 6,282,287 B1 | * | 8/2001 | Lin ............................ 345/619 |
| 6,324,284 B1 | * | 11/2001 | Hawker et al. ......... 379/433.02 |
| 6,438,227 B1 | * | 8/2002 | Kretsch ................. 379/433.02 |
| 6,473,625 B1 | * | 10/2002 | Williams et al. ......... 455/569.1 |
| 6,493,456 B1 | * | 12/2002 | Hansson ..................... 381/345 |
| 6,668,063 B2 | * | 12/2003 | Cimaz et al. ................ 381/345 |
| 6,704,429 B2 | * | 3/2004 | Lin ............................ 381/380 |
| 6,785,395 B1 | * | 8/2004 | Arneson et al. ............. 381/334 |
| 6,922,471 B1 | * | 7/2005 | Marqvardsen et al. . 379/433.02 |
| 2002/0136398 A1 | * | 9/2002 | Dufosse et al. ......... 379/428.01 |

FOREIGN PATENT DOCUMENTS

| | | |
|---|---|---|
| FR | 2665045 | 1/1992 |
| JP | 61139200 | 6/1986 |
| WO | WO 01/33904 A1 | 5/2001 |

\* cited by examiner

*Primary Examiner*—Rasha S. Al-Aubaidi
(74) *Attorney, Agent, or Firm*—Jones Day

(57) ABSTRACT

A method of manufacturing a telephony earpiece is provided. The method includes providing a speaker diaphragm and constraining the speaker diaphragm using a cap to provide a thin cavity between the cap and the diaphragm. The first resonance peak of the diaphragm/cavity system is damped by a first slow leak in the cap. The frequency response is built up using a rear resonator in the cap and the high frequency end response is enhanced using a front resonator on an opposite side of said diaphragm as said cap. Positioning of these resonator holes is an important factor. The earpiece is tuned using a second leak to adjust amplitude of low frequency end response.

9 Claims, 9 Drawing Sheets

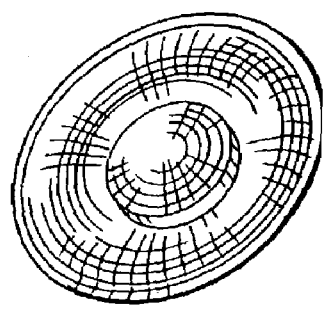
FIG.3a.
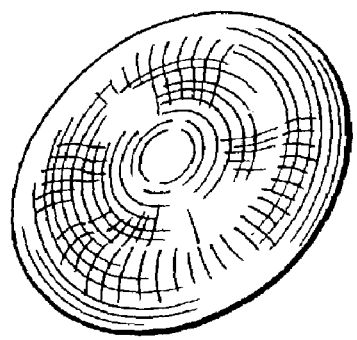
FIG.3b.
FIG.3c.
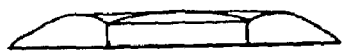
MODE $X_{00}$ (400 Hz)
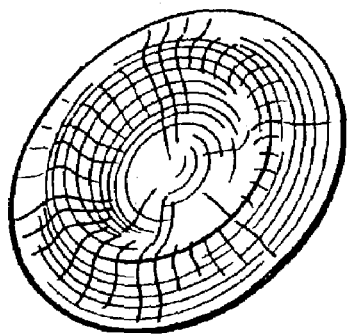
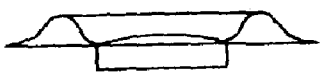
MODE $X_{10}$ (5500 Hz)

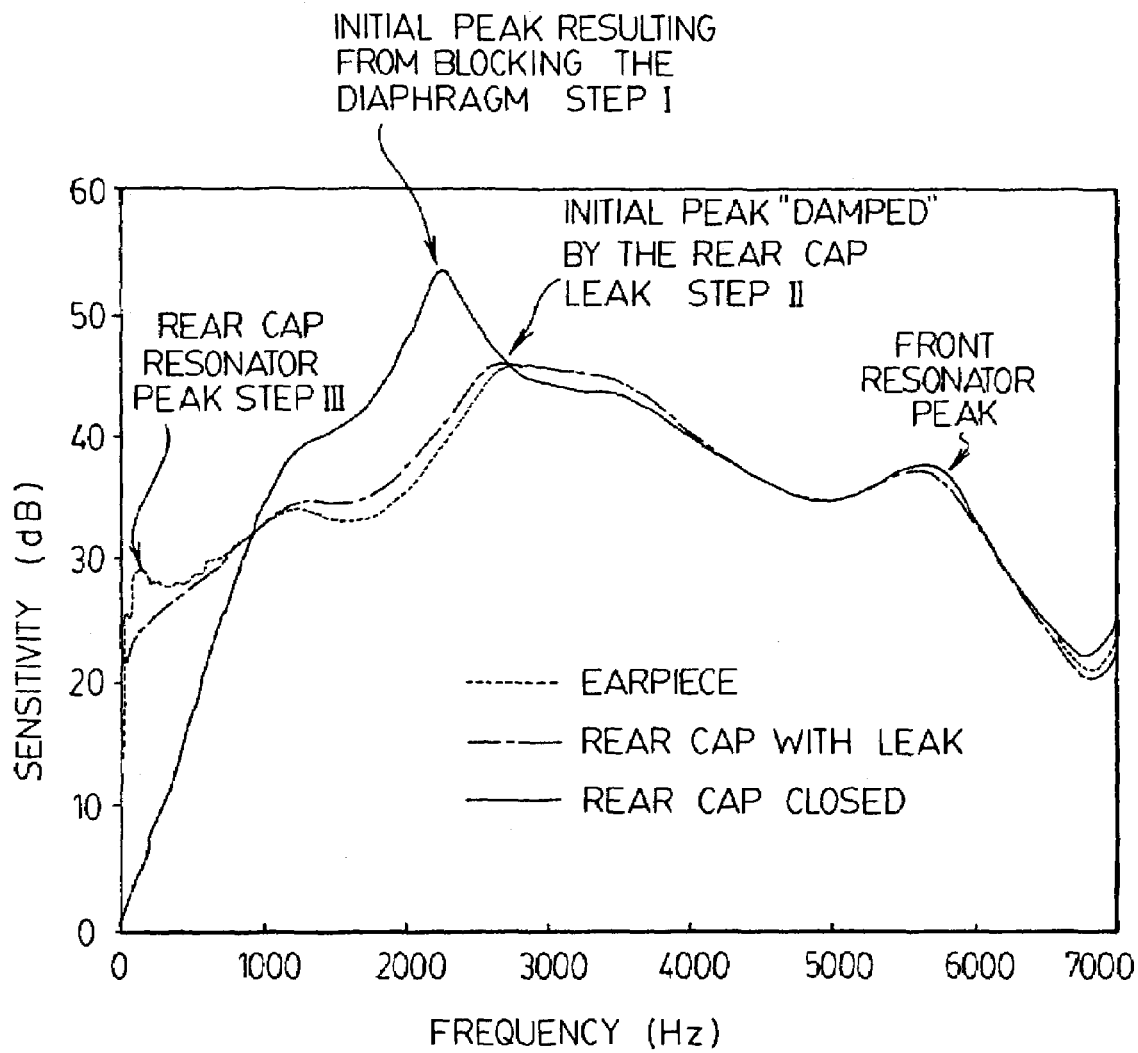

AUDIO EARPIECE FOR WIDEBAND TELEPHONE HANDSETS

FIELD OF THE INVENTION

The present invention relates to telephony earpiece receivers for wideband telephone handsets or headsets, in low and high leak conditions and in particular to 7 kHz audio in telephony.

BACKGROUND OF THE INVENTION

Receivers for a handset or headset are conventionally designed using a lumped parameter model. Using this model, the speaker diaphragm behaves as a piston, as discussed for example in *Theory & Design of Loudspeaker Enclosures* by J. E. Benson; (1996) Howard W. Sams & Co. ISBN 0-7906-1093-0 and *High Performance Loudspeakers*, by M. Colloms, (1997) John Wiley ISBN 0-471- 97089-1. In section 7.11 of *Acoustics* (L. L. Beranek; (1954) Acoustical Society of America (1996); ISBN 0-88318-494-X), Beranek recognises that the typical loudspeaker has a modal behaviour but concludes that no "tractable mathematical treatment is available by which the exact performance of a loudspeaker can be predicted . . . ". Beranek concludes that loudspeakers must be designed to minimise the diaphragm modal behaviour to permit the assumption that the cone of the diaphragm moves as a unit. Numerical methods such as Finite Element Methods (FEM) or Boundary Element Methods (BEM) allow accurate computation of the diaphragm vibration field and the associated acoustic radiated field.

Telephony receivers are designed to provide a frequency response for the traditional telephony band of 300-3000 Hz coupled to an ITU-P.57 type 1 (IEC318) artificial ear. Some telephony receivers have been designed for a low impedance-type artificial ear but again, only for the traditional telephony band. In conventional telephony receiver designs, the exact position of leaks or resonators with respect to diaphragm geometry does not matter. Measures to counter the modal behaviour of the diaphragm result in the use of filters that generally make the device large and inefficient.

The prior art provides insight into the approaches taken to counter modal behaviour, but none of the prior art explicitly exploits the modal nature of the diaphragm.

For example, U.S. Pat. No. 5,953,414 to Abraham & Dufossé discloses a piezoelectric speaker capsule for a telephone handset with leaks behind the diaphragm and a Helmholtz resonator to build the high frequency end of the earpiece. Due to the rigidity of this type of diaphragm, only one mode, namely the piston mode, is used and the rear cavity cannot block the diaphragm significantly to modify the vibration frequency. The speaker capsule is not designed to make several vibration modes appear in the frequency range of interest, even if leaks are provided to dampen the vibration field amplitudes of the disk.

U.S. Pat. No. 5,729,605 to Bobisuthi et al. discloses several configurations for adjusting the frequency response by varying various design parameters such as rear cavity size and leaks or front resonator leaks. Bobisuthi et al. discloses designs based on the lumped parameter model. Thus, the particular location of holes with respect to the diaphragm does not matter. Further, hole locations that excite unwanted modes are compensated for by adding or modifying a resonator.

WO 99/35880 (Williams & Mercer) discloses a low impedance-type earpiece. Using a front resonator, the diaphragm is uniformly loaded and thus the device is less sensitive to externally applied acoustic load. This design is again based on the simplified lumped parameter model.

U.S. Pat. No. 5,058,154 to Morten discloses a low acoustic impedance earpiece based on a pure acoustic ohmic connection between the diaphragm and the exterior of the handset. The path can be any shape but must have some sound damping material in it. This earpiece is designed based on the traditional model in which the diaphragm is modelled as a piston and the acoustic damping material is provided to deal with the unwanted diaphragm mode.

U.S. Pat. No. 5,784,340 to Kanai discloses a piezoelectric earpiece in which acoustical design considerations are limited to the resonator volume which is damped by a mesh and one or more holes.

SUMMARY OF THE INVENTION

In one aspect of the present invention, there is provided a method for designing a handset or headset earpiece that provides a substantially flat frequency response over a wide frequency range. This is accomplished by exploiting the modal nature of the transducer diaphragm. Generally, prior art electro-acoustic simulations are used, taking into consideration the discrete nature of the system (lumped parameter) where the modal nature of the diaphragm is not taken into consideration. In these prior art systems the diaphragm is considered as a piston. In an aspect of the present invention, however, at least two diaphragm vibration modes are taken into consideration and serve as a basis for the design.

Aspects of the present invention are based on the vibration modal nature of the speaker diaphragm and the behaviour of a system diaphragm/thin fluid layer when coupled to different resonators and leaks. Aspects of the present invention exploit axi-symmetric modes of the diaphragm. This is accomplished by determining the diaphragm vibration modes of interest and providing the acoustical circuitry (holes, leaks, cavities, etc.) to enhance, damp, or partially "block" these modes. The arrangement of an aspect of the present invention de-couples, to some extent, the effect of some of the leaks and the resonator providing enhanced low frequency performance without mid-range side effects.

In a particular aspect of a preferred embodiment, there is provided a device with desired acoustical response that is easily manufactured and is very small. The device includes a front resonator and a rear resonator with appropriately placed holes or slits to shape the response, as required. Only two parts are provided for the rear resonator and the front resonator is moulded into the handset housing. The earpiece is developed to meet the standard ITU-P.311.

Advantageously, the present invention can be used in a cell phone or a headset. In an aspect of the present invention, the cap having a combination of a leak and resonator holes, allows a thin design, the rear cap thickness being an adjustable parameter.

In a particular aspect of an embodiment of the present invention, there is provided a method of manufacturing a telephony earpiece. The method includes providing a speaker diaphragm, constraining speaker diaphragm vibration modes using a cap to provide a thin cavity between the cap and the diaphragm, damping a first diaphragm cavity coupled resonance peak by a first slow leak in the cap, the first slow leak positioned such that a diaphragm vibration field is not significantly affected, building a low end frequency response using a rear resonator in the cap, enhancing high frequency end response using a front resonator on an opposite side of the diaphragm as the cap, the front resonator including a plurality of holes and a front cavity, the plurality of holes optimally positioned to affect resonator frequency and response amplitude, and tuning the earpiece using a second leak to adjust amplitude of low frequency end response.

In another aspect of an embodiment of the present invention, there is provided a telephony earpiece device. The earpiece device includes a speaker diaphragm, a rear cap disposed on a rear side of the diaphragm to provide a cavity between the cap and the diaphragm for constraining the speaker diaphragm vibration modes, the cap having a slow leak for damping a first resonance peak and a rear resonator for building a low end frequency response, and a front resonator including a plurality of holes and a front cavity, the plurality of holes positioned for enhancing high frequency end response, the front resonator including a leak for adjusting low frequency end response amplitude.

BRIEF DESCRIPTION OF THE DRAWINGS

The invention will be better understood with reference to the drawings, and following description, in which:

FIGS. 3a, b and c show finite element modelling of a small speaker diaphragm showing first two axi-symmetric modes;

FIG. 5b is a cross-sectional side view of the earpiece of FIG. 5a.

FIG. 7 is a perspective view of a cap of the earpiece of FIG. 5a;

FIG. 9 is a frequency—sensitivity graph of the earpiece of FIG. 5a;

FIG. 10 is a frequency—response graph of the earpiece of FIG. 5a; and

DETAILED DESCRIPTION OF THE PREFERRED EMBODIMENT(S)

Figure 1:
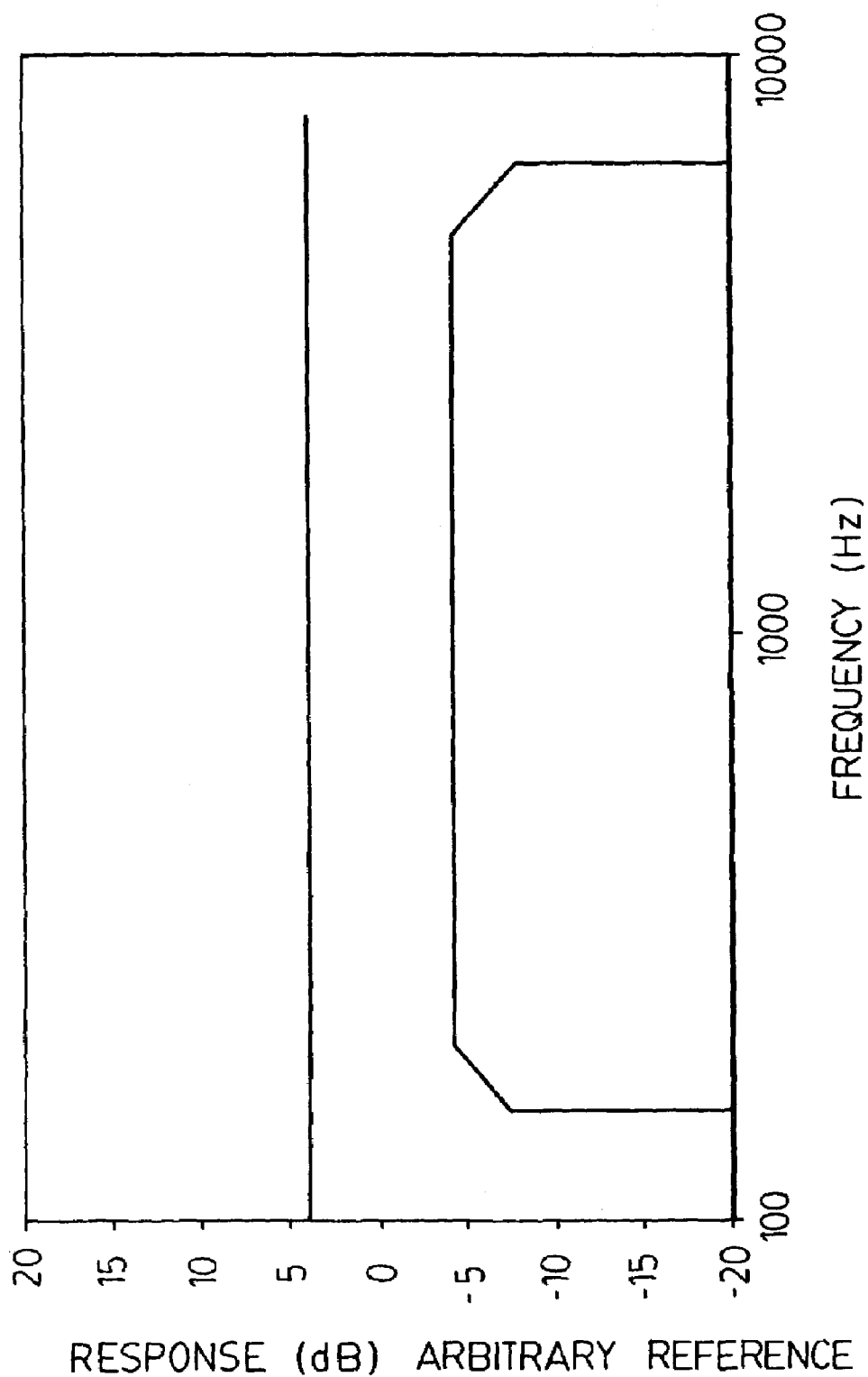
FIG. 1 is a graph showing a 7 kHz handset receive mask according to recommendation ITU-P.311.

A prior art ITU-T P.57 type 3.2 "high leak" or "low leak" artificial ear was employed in the development of the preferred embodiment of the present invention. Other artificial ears can be employed, such as type 3.3 or 3.4. The artificial ear includes a cavity and a tube whose respective dimensions are close to the "average" human ear. The low leak version of the artificial ear type 3.2 has two thin slots while the high leak version has a number of holes. These versions simulate the handset either tightly or loosely sealed on the ear. In an object of an aspect of the present invention, it is desirable to have an earpiece receive frequency curve at Ear Reference Point (ERP) that is flatter than that of the prior art and fits in the mask in FIG. 1 (from recommendation ITU P.311).

Figure 2:
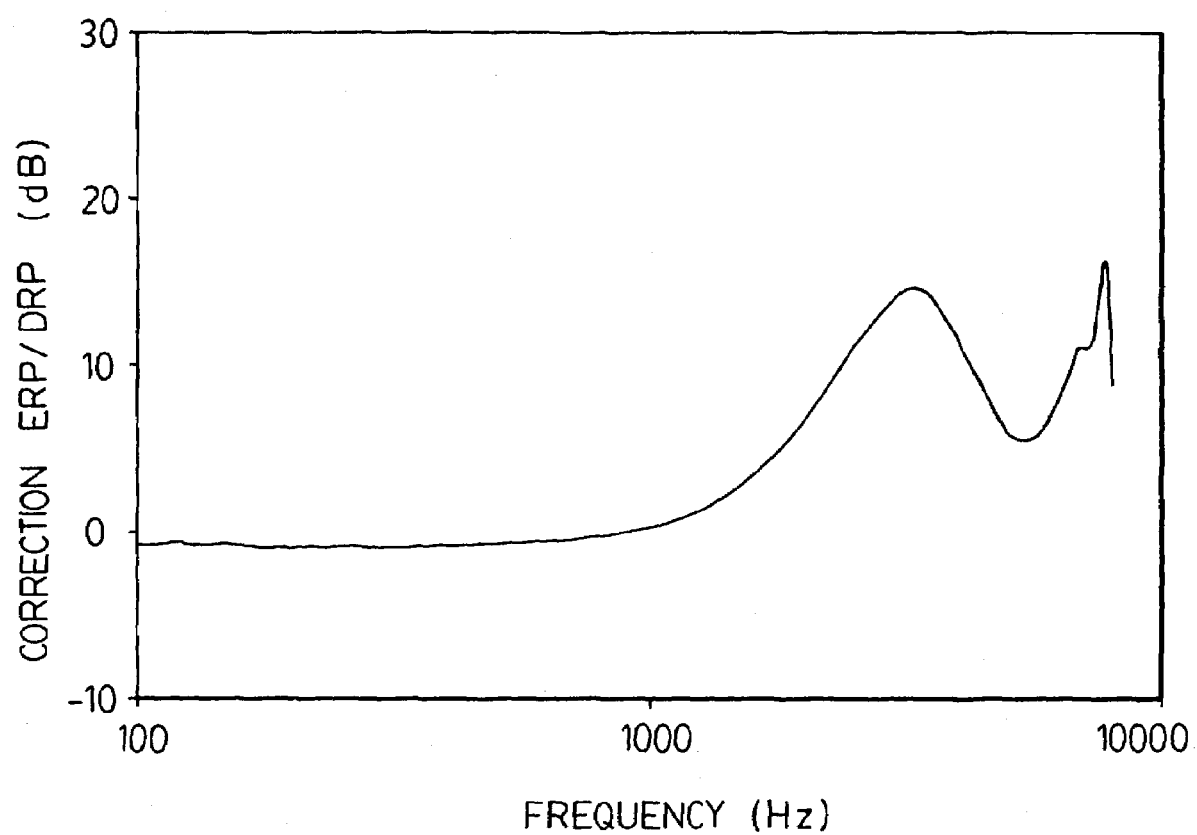
FIG. 2 is a graph showing a drum reference point/ear reference point correction curve for measurement using an artificial ear microphone and a probe microphone of the prior art, normalised at 1 kHz.

The artificial ear microphone membrane is located at the ear drum position (DRP or Drum Reference Point). The pressure is measured at the ERP (Ear Reference Point), however. Thus, a correction is introduced when performing the measurement. This correction is shown in FIG. 2.

The pressure can be measured directly at the ERP when the earpiece is sealed on the artificial ear by using a probe microphone in order to avoid using the correction ERP/DRP in the open ear condition, in accordance with recommendation ITU-P.311. A modified earpiece with a groove at the front face can be used in such a configuration.

The present invention exploits some loudspeaker diaphragm vibration eigenmodes and classical Helmholtz resonators to get a response, which is as wide and as flat as possible.

Diaphragm Characteristics

A 30-mm diaphragm is used in the following description for exemplary purposes. The first resonance frequency of the diaphragm is about 400 Hz.

Figure 4A:
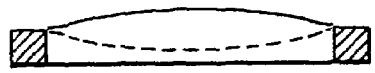
FIGS. 4a and 4b are cross sectional side views of a small speaker backed with a thin layer of fluid, illustrating exemplary vibration modes.
Figure 4B:

Referring to eigenmodes or modes, as will be understood by those of skill in the art, a modal analysis of the diaphragm exhibits the vibration mode shapes $\Phi_i$ associated with the diaphragm resonant frequencies in-vacuo. An exemplary modal analysis for a circular diaphragm is shown in FIGS. 3a to 3c and exemplary modes are shown in FIGS. 4a and 4b.

When voltage is applied on loudspeaker pins, an electromagnetic force is generated on the voice coil. The resulting diaphragm displacement (or acceleration) vibration field vs. frequency $\gamma(f)$ is the linear sum of the diaphragm vibration modes $\Phi_i$:

$$\gamma(f) = \sum_{1}^{\infty} b_i(f)\Phi_i$$

where $b_i(f)$ i=1,2, . . . is a unique set of coefficients depending on frequency.

Due to the direction of the electromagnetic force on the voice coil, the vibration field is dominated by the first diaphragm mode (up-and-down movement (FIG. 4a)) in a wide band of frequencies. Other modes can contribute to the vibration, primarily modes having an axi-symmetric shape relative to an axis normal to the centre of the diaphragm surface.

The first speaker diaphragm axi-symmetric eigenmodes in the low and medium frequency range are of interest and are described below.

The natural mode shapes shown in FIGS. 3b and 3c are present in any speaker. The frequency and rank of these mode shapes can vary. By analogy with a perfect thin elastic "disk" membrane, (with comparable boundary conditions) these natural modes are denoted as $\chi_{r,\theta}$. Where, r is the number of circular nodal lines (except the boundary) and $\theta$ is the number of diametrical nodal lines. Mode $\chi_{00}$ and mode $\chi_{10}$ generally occur in any circular speaker diaphragm and are of particular interest. The frequency of these two modes is important.

It should be noted that the term antinode is used in referring to mode-shape points having maximum amplitude and nodes or nodal lines to areas where mode-shapes have zero amplitude. Many other modes exist for the speaker diaphragm between 400 Hz and 5500 Hz. Modes having an axi-symmetric shape are of primary interest.

Constraining the Diaphragm Displacement Field

Coupled to a thin rigid fluid cavity, the diaphragm experiences a strong modification of its vibration field. Particularly, the vibration modes of the diaphragm coupled with the cavity are very different from that in free air. This characteristic is exploited in an aspect of the present invention.

Figure 5A:
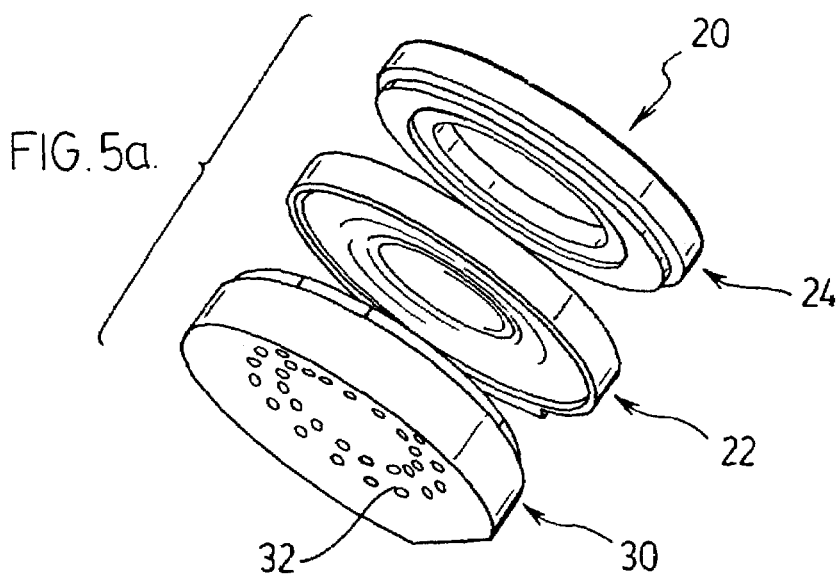
FIG. 5a is an exploded perspective view of an earpiece according to a preferred embodiment of the present invention.

Reference is now made to FIG. 5 to show a preferred embodiment of the audio earpiece of the present invention, indicated generally by the numeral 20. In order to exploit the modal nature of the diaphragm 22, in particular the $\chi_{10}$ mode, the speaker diaphragm 22 is partially "blocked" with a cap 24 which is tightly closed at the rear side of the speaker diaphragm 22. Thus, only a thin layer of fluid is present in the cavity behind the diaphragm 22. This results in a single diaphragm resonance in the frequency range 100 Hz-6 kHz, referred to herein as the first diaphragm coupled mode of the system diaphragm/thin fluid layer. Coupled with a thin rigid cavity as described, the diaphragm acceleration field (or vibration field) is dominated by the $\chi_{10}$ mode contribution. Due to the size of the diaphragm (diameter=30 mm), the pressure field is constant in the perfectly enclosed thin fluid layer. No standing waves exist and thus no pressure variations occur in the cavity below about 5 kHz. The only diaphragm displacement fields that exist are those that respect the constant pressure in the cavity, i.e. fields that do not induce a significant volume variation in the fluid layer. Thus, the first mode (mode $\chi_{00}$ shown in FIG. 4a) contribution in the displacement field is partially blocked since it induces a strong volume variation in the fluid layer.

The diaphragm vibration field in FIG. 4a is inhibited since it induces a volume variation and thus a pressure variation in the cavity. The vibration field shown in FIG. 4b occurs as there is no significant volume variation of the cavity and thus the pressure field is constant. The presence of a thin rigid cavity with a thin layer of fluid contributes to partially block a diaphragm vibration field such as that shown in FIG. 4a and to favour a vibration field such as that shown in FIG. 4b, maintaining the pressure field inside substantially constant.

Figure 6A:
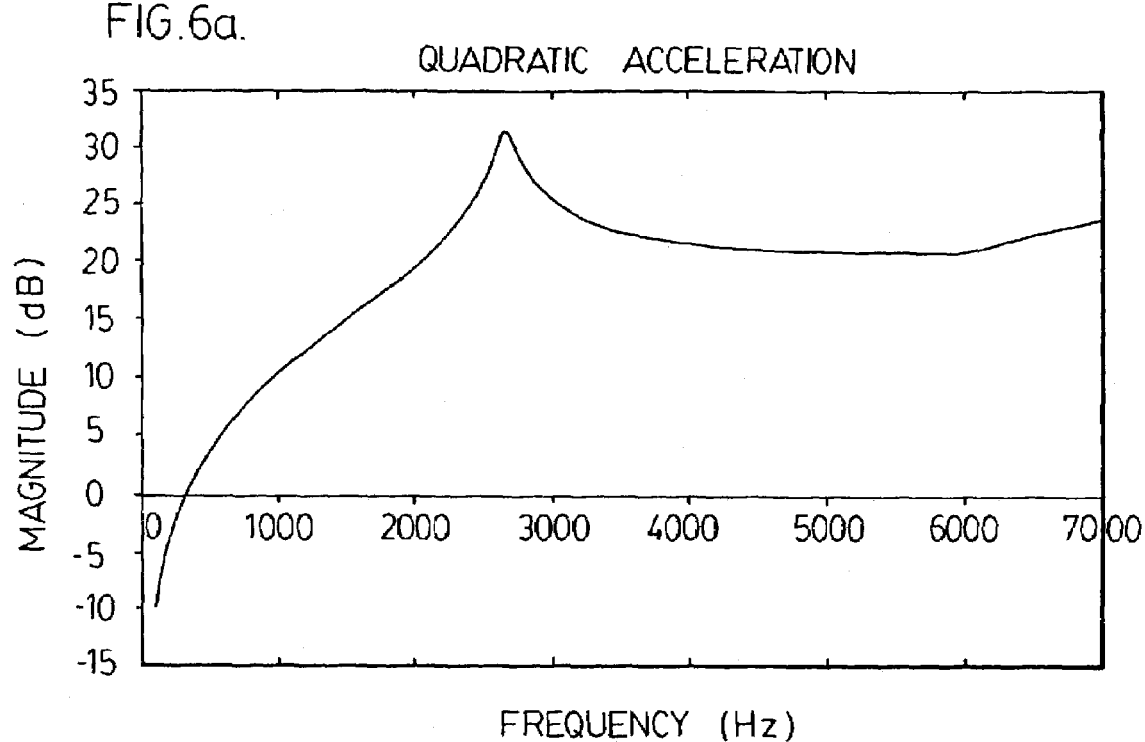
FIGS. 6a to 6c include a graph showing the first resonance of the coupled system diaphragm/thin fluid layer and a corresponding diaphragm shape dominated by a contribution of natural mode $\chi_{10}$ with a reduced $\chi_{00}$ contribution.
Figure 6B:
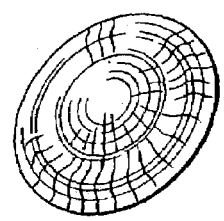
Figure 6C:
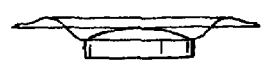

Therefore, in the diaphragm 22 and thin rigid cavity, the first resonance occurs in the medium frequency range and the corresponding diaphragm 22 shape is dominated by the contribution of the natural mode $\chi_{10}$, with a reduced $\chi_{00}$ contribution, as shown in FIG. 6.

The final first coupled frequency of the system diaphragm/cavity depends on the volume of the fluid layer and the initial characteristics of the diaphragm 22.

To achieve a diaphragm frequency response close to the one shown in FIG. 6a, the dimensions of the rigid cavity are optimised according to the characteristics of the diaphragm 22 used for building the earpiece 20. Note that the Figures are given here for illustration purposes and are based on the diaphragm 22 presented in FIG. 4, for exemplary purposes.

Using a thin fluid layer to block the diaphragm 22 reduces the overall vibration amplitudes. Low acoustic power is sufficient for the earpiece 20 and therefore there is a trade off to blocking the diaphragm 22 since electro-acoustic efficiency is reduced for the modified acoustic response. In the present example, the first coupled mode resonant frequency is experimentally tuned to about 2.4 kHz.

Damping the Diaphragm Resonance Peak

Figure 7:
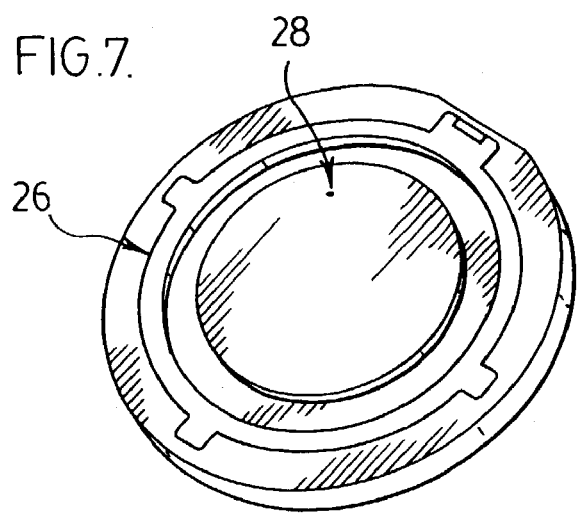

Referring now to FIG. 7, the cap 24 is shown. The cap 24 includes a thin slot 26 for damping the first resonance peak of the system diaphragm/cavity (at 2.4 kHz in the present example). The thin slot 26 introduces a "slow" leak inducing friction of the fluid under pressure as the fluid passes through the thin slot 26. The size of the thin slot 26 is dependent on the diameter or length of the slot 26 and the cap 24 thickness. In an alternative embodiment, the slot is large with a nylon screen or a porous material (open cell foam, felt . . . ) to ensure that a slow leak is introduced. The dimensions of the thin slot 26, t, g and d, shown in FIG. 7 are optimised to provide a low frequency resonator and a diaphragm/cavity coupled frequency close to 3 kHz.

The position of the slot 26 is important since it impacts the response of the diaphragm 22. If the slot is located close to the centre of the diaphragm 22, the mode n 1 ($\chi_{00}$) contribution reappears in the displacement field because the pressure field is no longer constant in the cavity. In order to dampen the coupled mode, the slot 26 in the cap 24 (1/1000 to 5/1000 inch) is located far from mode $\chi_{00}$ antinode and preferably as far as possible from the centre of the diaphragm 22, i.e. all around the speaker. The slot 26 dimensions are adjusted to strongly dampen the resonance peak and account for a shift in the frequency of the resonance peak up depending on the slot characteristics. In the present example, the resonance peak is shifted from about 2.4 to about 2.8-2.9 kHz. An all circular slot is preferable to small holes due to the axi-symmetric nature and a uniform spread viscous damping all around. The pressure in the thin fluid layer is no longer constant because of the slot. The pressure field amplitudes tend to "follow" the diaphragm 22 displacement field amplitudes and there is a drop of pressure close to the slot, as confirmed through finite element FE/BE analysis. As the slot is close to a node of $\chi_{00}$ (area of low amplitude), it does not significantly impact the shape of the vibration field. It simply has a damping effect and a frequency shift effect.

In order to achieve the desired result, the slot is optimised according to the dimensions of the cap cavity, cap depth and the diaphragm 22.

Building the Low Frequency End Response

Resonator holes or tubes 28 are introduced into the cap 24 to reach the low frequency end response. They are placed as close as possible to a diaphragm nodal line (subject to industrial design considerations) and avoid the centre area where high-pressure field occur. These tubes 28 (Helmholtz's resonator tubes) are used to exploit the rear cap cavity (the thin layer of fluid behind the diaphragm 22). The resonator is tuned in the present embodiment, to about 120-150 Hz, by adjusting the number of tubes 28, the tube length and opening area. Since the system is fully coupled, opening holes in the cap influences the diaphragm/cavity system frequency response. Due to the new leak introduced by the Helmholtz resonator design, the coupled mode resonance shifts slightly up from 2.9 kHz to 3 kHz, in a frequency range where it replicates the ERP/DRP correction curve shown in FIG. 2.

High Frequency End Response: Design of the Front Resonator

Figure 8A:
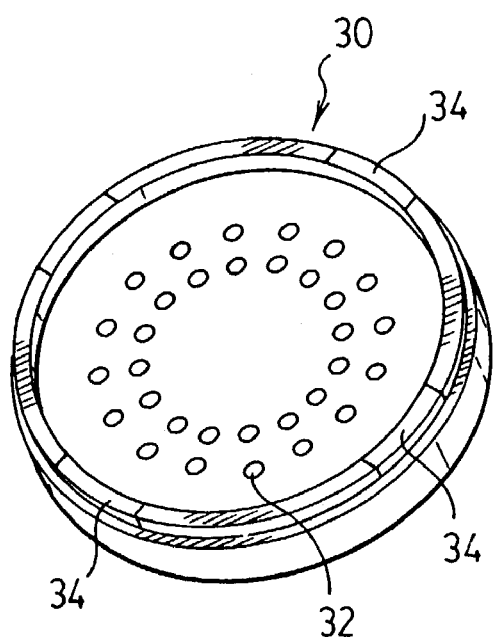
FIG. 8 is a perspective view of a front resonator of the earpiece of FIG. 5a, including a close-up view of one of four stands of the front resonator.
Figure 8B:
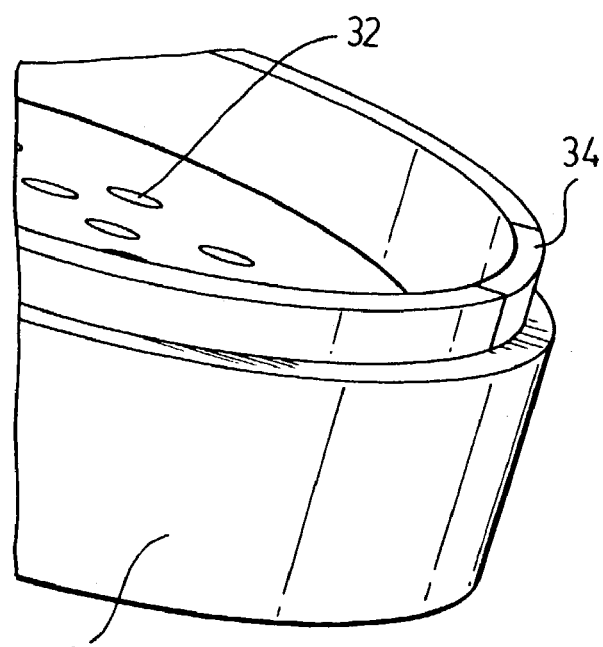

A front resonator 30 with holes (tubes) 32 and a cavity is located in front of the speaker diaphragm 22, as shown in FIGS. 5 and 8. The front resonator 30 is intended to enhance the response at high frequency close to 6 kHz. Parameters of this resonator are adjusted taking into account the coupling with the diaphragm 22, the rear cap 24 and the artificial ear characteristics. These parameters are adjusted using FEM/BEM methods or by experimentation. The front resonator 30 is optimised by adjusting the number of resonator tubes 32, the diameter and the depth of these tubes 32.

The position of the tubes 32 in the front resonator 30 significantly impacts the frequency resonance and peak amplitude of the resonator 30 when a thin cavity is employed. This is a result of the non-constant nature of the pressure field in the front cavity. The pressure field in the front cavity with the tubes 32 in the front resonator 30, tends to follow the diaphragm vibration field and has a maximum close to the diaphragm centre. If holes are opened in this area, the diaphragm is not able to compress properly the fluid in the front cavity. If holes are opened on an external ring, then the cavity volume can be properly compressed and the Helmholtz resonator works properly. A parametric study on the position of the holes shows that frequency shifts of several hundred Hertz can occur, as well as a drop in amplitude for central holes. Thus, holes are opened taking into account the diaphragm vibration field, its' near-field radiated pressure as well as Industrial Design constraints. Positions far from the high-pressure central area proved the more efficient.

For simplicity and ease of manufacturing, the front resonator 30 can be moulded in the telephone handset.

Figure 10:
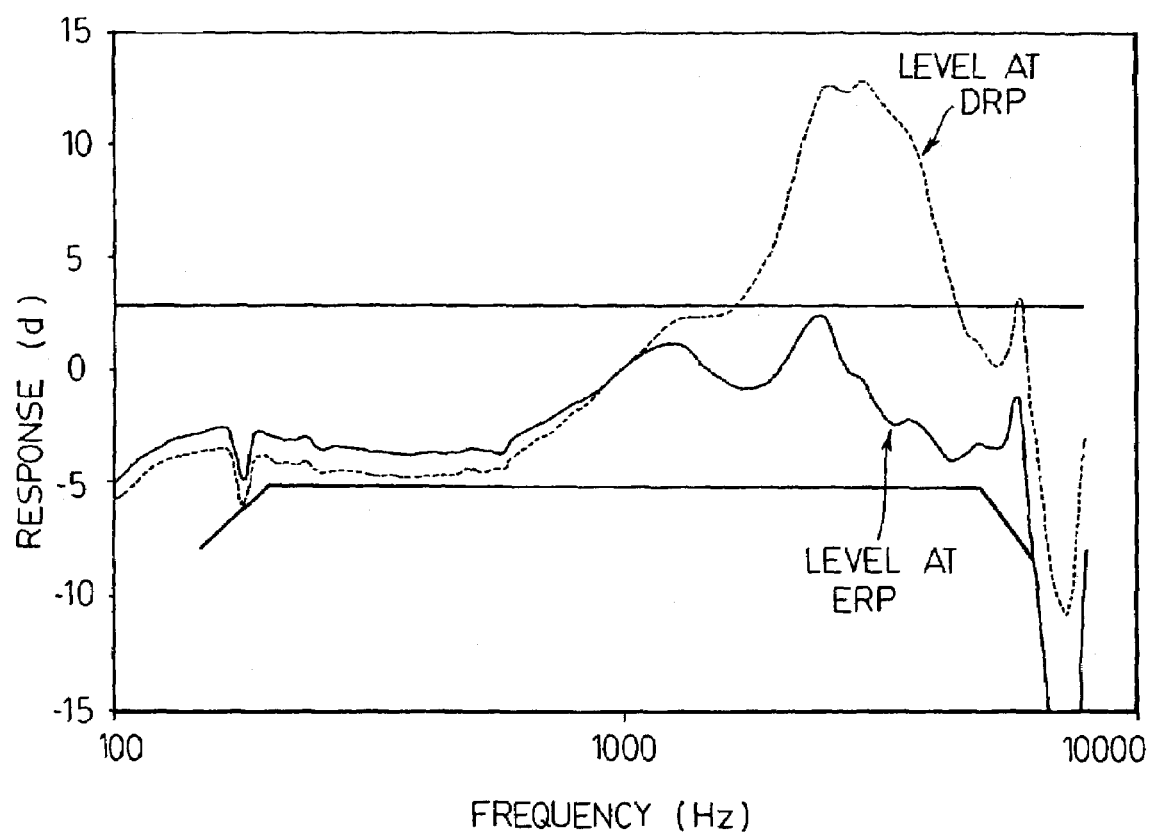

FIG. 9 illustrates the sensitivity of different systems, measured when sealed on an artificial ear type 3.2 "low leak" (Brüel & Kjær 4195). The measurement displays the sensitivity at the DRP (Drum Reference Point). The curve "earpiece" is corrected using the DRP-ERP curve in FIG. 2. FIG. 10 shows the resultant curve with the ERP-DRP correction. The earpiece sensitivity at ERP is substantially flat and falls within the 8 dB limit of the receive standard in FIG. 1. The maximum variation for this design is approximately 6.5 dB and thus, there is some tolerance for manufacturing variations.

Final Tuning

Next, the earpiece 20 is tuned by adding a leak at the diaphragm 22/front resonator 30 interface and/or at the front resonator 30/ear interface. The leak is added to adjust the amplitude of the low frequency end response for making it "leak tolerant". The leak induces a drop in the low frequency end sensitivity when the handset is not in tight contact with the ear. This leak also inhibits the effects of variations in the diaphragm 22 characteristics from one diaphragm 22 to another. The leak is located either at the front resonator 30 cavity or outside the handset. Referring to FIG. 8, the leak is produced by adding stands 34 on the outer surface of the front resonator 30. The leak is produced by a set of cut outs or, more preferably, is a continuous slow leak around the handset with local stands 34 to ensure a tight diaphragm 22 frame/front resonator 30 contact.

The slow leak primarily affects the sensitivity low-frequency end below 1.0 to 1.5 kHz. The leak generally has little effect on the wide peak at 2.9 kHz and the high resonance peak close to 6 kHz. Thus, this leak is useful for tuning the low frequency sensitivity.

Extension to 7 kHz "High Leak" Earpiece.

The high leak earpiece 20 rear cap 24 and front resonator 30 are designed in the same manner as described above. The earpiece 20 parameters are tuned using, for example, the Type 3.2 artificial ear "high leak" version or, alternatively the Type 3.3 artificial ear (on the head and torso simulator).

Figure 5B:
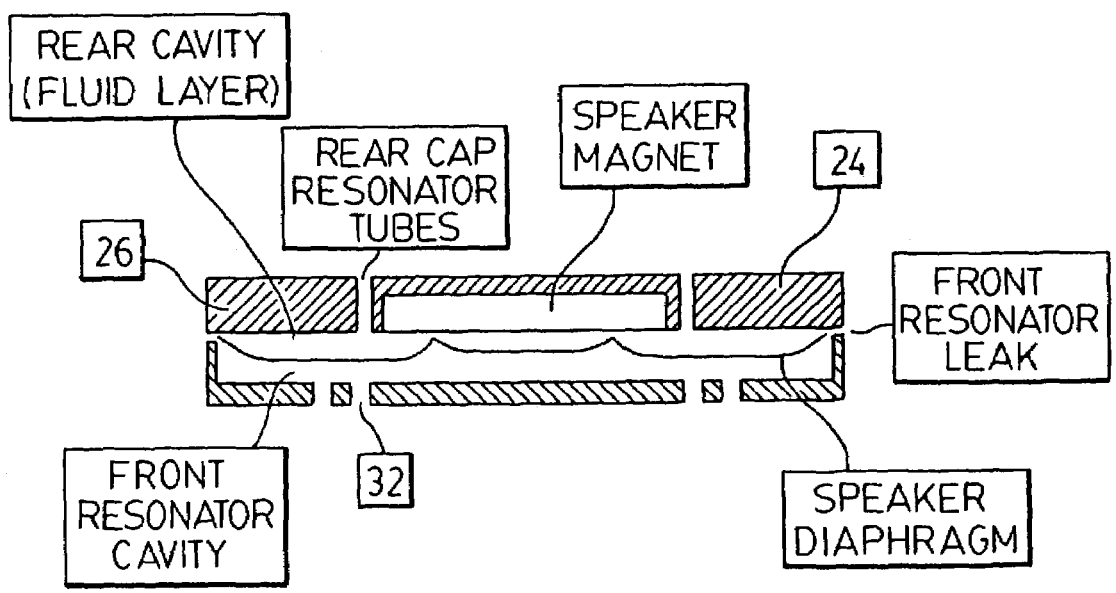
Figure 11:
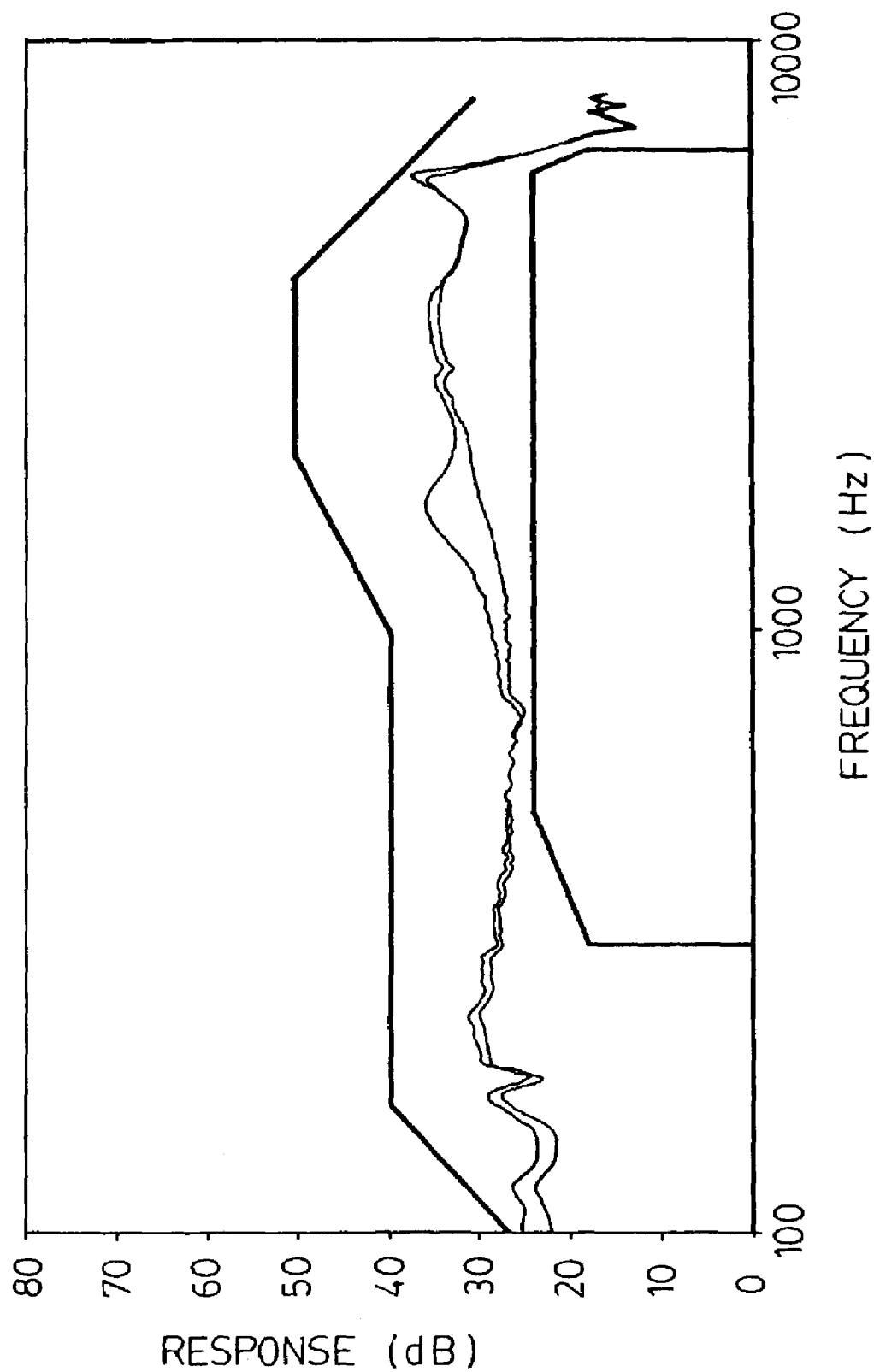
FIG. 11 is a frequency—response graph of a 7 kHz "high leak" earpiece according to an embodiment of the present invention.

Referring to FIG. 5*b* and to FIG. 7, optimisation of the rear cap 24 generally results in a wider slot 26 and increased diameter of holes 28 in the cap 24 (and possibly increased number of holes 28). Additionally, as the frequency response amplitude is increased in the low frequency end to compensate for the leak at the front resonator 30/listener ear interface, no leak is open at the diaphragm 22/front resonator 30 interface. FIG. 11 shows the 7 kHz high leak earpiece frequency response at ERP on an artificial ear type 3.2 "high-leak". The response shown in FIG. 11 fits in the mask for wideband audio handset (recommendation ITU-P.311). The darker curve describes the earpiece frequency response when covered with low-density foam.

It will be appreciated that the frequency response at ERP of the handset earpiece 20 applied to Type 3.2 artificial ear version "High-leak" is similar to the frequency response of the handset earpiece 20 applied to Type 3.2 artificial ear version "Low-leak". It is to be understood that the present embodiment can be extended to a handset working in high leak conditions, such as a cell phone handset to meet recommendation ITU-P.311 shown in FIG. 1.

While the embodiments discussed herein are directed to particular implementations of the present invention, it will be apparent that variations and modifications to these embodiments are within the scope of the invention as defined by the claims appended hereto.

We claim:

1. A telephony earpiece device comprising:
    a speaker diaphragm;
    a rear cap disposed on a rear side of said speaker diaphragm to provide a cavity between said rear cap and said speaker diaphragm, said cavity having dimensions selected to constrain a $X_{00}$ vibration mode of said speaker diaphragm such that a $X_{00}$ vibration mode dominates, said rear cap having a slow leak located adjacent a diaphragm nodal line of said $X_{00}$ vibration mode for damping a first resonance peak and a rear resonator for building a low end frequency response,
    said rear resonator having a plurality of rear holes in said rear cap located intermediate of said low leak and a centre area of said rear cap proximal a diaphragm nodal line of said $X_{00}$ vibration mode; and
    a front resonator including a plurality of front holes and a front cavity, said plurality of front holes optimally positioned for enhancing high frequency end response, said front resonator including a leak for adjusting low frequency end response amplitude.

2. The device according to claim 1 wherein said rear cap includes a slot to provide said slow leak.

3. The device according to claim 2 wherein said slot further comprises at least one of a nylon screen and a porous material to facilitate said slow leak.

4. The device according to claim 1 wherein said rear resonator in said rear cap is tuned between about 120 to about 150 Hz.

5. The device according to claim 1 wherein said front resonator enhances a high frequency response of about 6 kHz.

6. The device according to claim 1 wherein said front resonator is molded in a handset.

7. The device according to claim 1 wherein said leak in said front resonator is disposed at the speaker diaphragm to front resonator interface.

8. The device according to claim 1 wherein said wherein said leak in said front resonator is disposed at the front resonator to ear interface.

9. The device according to claim 1 wherein said front resonator has stands on an outer surface for providing said leak in said front resonator.

* * * * *